(12) United States Patent
Albsmeier et al.

(10) Patent No.: US 9,425,727 B2
(45) Date of Patent: Aug. 23, 2016

(54) CHARGING AN ENERGY STORAGE DEVICE WITH A VARIABLE SPEED GENERATOR

(75) Inventors: Eric D. Albsmeier, Sheboygan, WI (US); Richard A. Mauk, Sheboygan, WI (US); Isaac S. Frampton, Strattanville, PA (US); Harrison C. Chiu, Grafton, WI (US)

(73) Assignee: Kohler Co., Kohler, WI (US)

( * ) Notice: Subject to any disclaimer, the term of this patent is extended or adjusted under 35 U.S.C. 154(b) by 774 days.

(21) Appl. No.: 13/448,729

(22) Filed: Apr. 17, 2012

(65) Prior Publication Data

US 2013/0274934 A1     Oct. 17, 2013

(51) Int. Cl.
    *H02P 9/48* (2006.01)
    *H02J 7/14* (2006.01)
(52) U.S. Cl.
    CPC .............. *H02P 9/48* (2013.01); *H02J 7/1438* (2013.01)
(58) Field of Classification Search
    USPC ................................................ 700/286–287
    See application file for complete search history.

(56) References Cited

U.S. PATENT DOCUMENTS

| | | | |
|---|---|---|---|
| 6,031,294 A * | 2/2000 | Geis et al. ...................... | 290/52 |
| 6,175,217 B1 | 1/2001 | Da Ponte et al. | |
| 6,229,279 B1 * | 5/2001 | Dierker ......................... | 320/104 |
| 6,487,096 B1 * | 11/2002 | Gilbreth et al. ................ | 363/35 |
| 6,657,416 B2 * | 12/2003 | Kern et al. ...................... | 322/29 |
| 6,737,762 B2 | 5/2004 | Koenig | |
| 6,831,464 B2 | 12/2004 | Yang | |
| 7,369,417 B2 | 5/2008 | Morcov et al. | |
| 7,573,145 B2 | 8/2009 | Peterson | |
| 7,855,466 B2 | 12/2010 | Bax | |
| 7,880,331 B2 | 2/2011 | Bax et al. | |
| 7,999,405 B2 | 8/2011 | Peterson | |

(Continued)

FOREIGN PATENT DOCUMENTS

| | | |
|---|---|---|
| CN | 101647170 | 2/2010 |
| WO | WO-2008063575 | 5/2008 |
| WO | WO 2012069497 A1 * | 5/2012 |

OTHER PUBLICATIONS

"Chinese Application No. 201310101340.9, Notification of the First Office Action dated Nov. 4, 2014", [with English translation], (Nov. 4, 2014), 31 pgs.

(Continued)

*Primary Examiner* — Robert Fennema
*Assistant Examiner* — Giovanni Naula
(74) *Attorney, Agent, or Firm* — Schwegman, Lundberg & Woessner, P.A.

(57) ABSTRACT

Some embodiments relate to a power management system. The power management system includes a variable speed generator that provides a voltage output to a bus that is adapted to be connected to a load and an energy storage device. The power management system further includes a generator controller that controls the speed of the variable speed generator and monitors a charge level of the energy storage device. The generator controller also remotely displays information relating to the charge level of the energy storage device by supplying information relating to operation of the power management system over a network. The generator controller may remotely display information relating to the charge level of the energy storage device by supplying information relating to operation of the power management system over the Internet. The generator controller may also start/stop the variable speed generator based on the charge level of the energy storage device.

23 Claims, 3 Drawing Sheets

(56) References Cited

U.S. PATENT DOCUMENTS

| | | |
|---|---|---|
| 8,022,572 B2 | 9/2011 | Vyas et al. |
| 8,160,725 B2 * | 4/2012 | Allgaier et al. ............ 700/12 |
| 8,169,755 B2 | 5/2012 | Sugita |
| 8,694,176 B2 * | 4/2014 | Yamamoto et al. ......... 700/297 |
| 2004/0084965 A1 | 5/2004 | Welches et al. |
| 2004/0199297 A1 * | 10/2004 | Schaper et al. ............. 700/287 |
| 2007/0017223 A1 * | 1/2007 | Wootton et al. ............. 60/645 |
| 2007/0296376 A1 * | 12/2007 | Marquet et al. ............. 320/101 |
| 2008/0157600 A1 | 7/2008 | Marlenee et al. |
| 2009/0140576 A1 | 6/2009 | Yu et al. |
| 2009/0150818 A1 * | 6/2009 | Bakhreiba et al. ........... 715/771 |
| 2010/0318233 A1 * | 12/2010 | Yunes et al. ................. 700/287 |
| 2011/0101778 A1 | 5/2011 | Yang |
| 2011/0215641 A1 | 9/2011 | Peterson et al. |
| 2011/0273129 A1 | 11/2011 | Coe et al. |
| 2012/0239214 A1 * | 9/2012 | Nakashima et al. ......... 700/291 |
| 2012/0256483 A1 | 10/2012 | Nakashima et al. |

OTHER PUBLICATIONS

"Chinese Application No. 201310101340.9, Office Action mailed May 22, 2015", (w/ English Summary), 13 pgs.

"Chinese Application No. 201310101340.9, Office Action dated Sep. 6, 2015", (Sep. 6, 2015), 13 pgs.

* cited by examiner

CHARGING AN ENERGY STORAGE DEVICE WITH A VARIABLE SPEED GENERATOR

TECHNICAL FIELD

Embodiments pertain to a power management system, and more particularly to a power management system that charges an energy storage device with a variable speed generator.

BACKGROUND

Power management systems are used to selectively provide power to various types of power consuming loads. Some power management systems include a variety of different power sources.

As an example, some conventional power management systems are used in remote locations and include a primary power source (e.g., a wind, solar or hydro power source) and a secondary power source (e.g., a generator that operates when load demand cannot be met by the primary power source). The primary power sources in such systems typically either (i) operate the loads directly; (ii) charge a battery that operates the loads when the primary power source is unavailable; or (iii) a combination of both. The secondary power source is then used to (i) operate the loads directly when the primary source is unable to meet demand; and/or (ii) charge the batteries when the batteries require charging.

One of the drawbacks with some existing power management systems is that they typically include a constant speed generator that is often oversized for a particular application. Therefore, the constant speed generators that are typically used in such applications usually operate below peak efficiency.

Another drawback with existing power management systems is that they are often unable to charge the battery while the generator is being used to provide power to a load. Therefore, in situations where the primary power source becomes unavailable for extended periods of time, the battery may be damaged.

Some power management systems may try to overcome such a drawback by starting the generator much sooner in order to prevent damage to the battery. However, starting the generator sooner in such systems underutilizes the battery and undesirably causes the generator to burn fuel unnecessarily.

Therefore, a need exists for a power management system that includes a variable speed generator. In addition, the power management system should be able to charge the battery while the generator is being used to provide power to a load.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
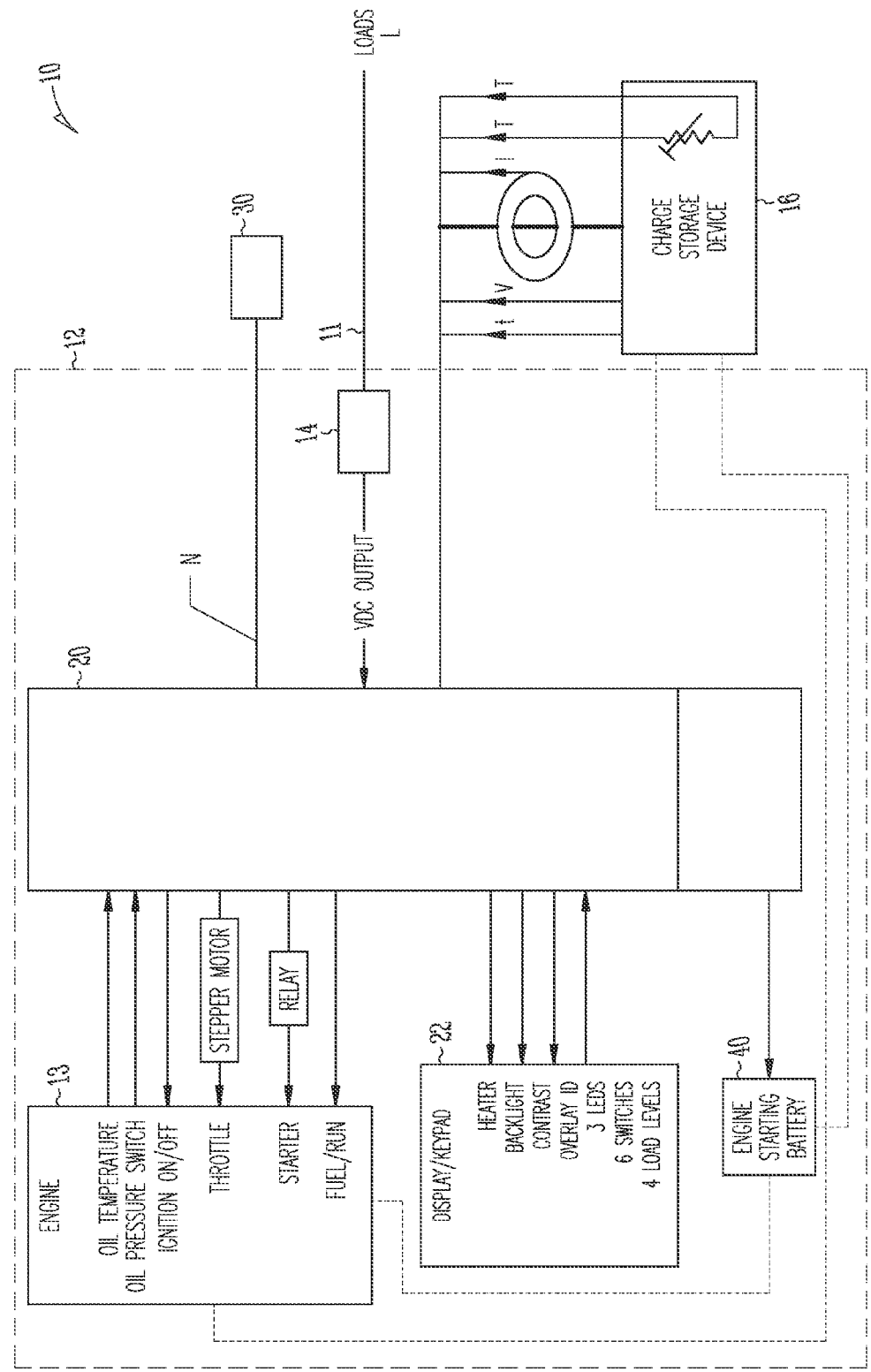
FIG. 1 is a functional block diagram illustrating an example power management system that includes a generator controller.

FIG. 1 is a functional block diagram illustrating an example power management system 10. The power management system 10 includes a variable speed generator 12 that provides a voltage output to a bus 11. The bus 11 is adapted to be connected to a load(s) L and an energy storage device 16.

The power management system 10 further includes a generator controller 20 that controls the speed of the variable speed generator 12. The generator controller 20 monitors a charge level of the energy storage device 16. The generator controller 20 also remotely displays information relating to the charge level of the energy storage device 16 by supplying information relating to operation of the power management system 10 over a network N. In some embodiments, the generator controller 20 may remotely display information relating to the charge level of the energy storage device 16 by supplying information relating to operation of the power management system over the Internet.

As an example, the variable speed generator 12 may include an internal combustion engine 13 that drives an alternator 14. It should be noted that the embodiments are contemplated where other types of power sources are utilized in the power management system 10.

In some embodiments, the generator controller 20 starts and stops the variable speed generator 12 based on the charge level of the energy storage device 16. In addition, the generator controller 20 may additionally (or alternatively) supply power from the variable speed generator 12 to the energy storage device 16.

As an example, the generator controller 20 may supply power from the variable speed generator 12 to the energy storage device 16 based on the charge level of the energy storage device 16. It should be noted that any type of energy storage device 16 that is known now, or discovered in the future, may be included in the example power management system 10 described herein. The type of energy storage device 16 that is included in the power management system 10 will depend in part on cost and/or the application where the power management system 10 will be used.

Embodiments are contemplated where the generator controller 20 includes a display 22 that provides information relating to operation of the power management system 10. As examples, the generator controller 20 may display information relating to a charge level of the energy storage device 16, and/or the display 22 may display information relating to a percentage load of the variable speed generator 12.

In some embodiments, a server 30 may be connected to the generator controller 20 over the network N. The server 30 may store information relating to the charge level of the energy storage device 16 and/or the operation of the power management system 10 (among other types of operational information).

In another example embodiment, the generator controller 20 may control the speed of the variable speed generator 12. The generator controller 20 monitors at least one of (i) a voltage V of the energy storage device 16; (ii) a current I supplied by the energy storage device 16; (iii) a temperature T of the energy storage device 16; and (iv) a time t in service of the energy storage device 16. The generator controller 20 may determine a charge level of the energy storage device 16 based on at least one, some or all of the time t, voltage V, current I and temperature T.

Embodiments are contemplated where the generator controller 20 monitors current I supplied by the energy storage device 16 accumulated over time. This monitoring may be done in order to facilitate determining the overall health of the energy storage device 16 over the life of the energy storage device 16 (e.g., when the energy storage device 16 is a battery).

In some embodiments, the generator controller 20 may determine a charge level of the energy storage device 16 by comparing at least one of the voltage V, current I and temperature T with data stored in the generator controller 20. The data stored in the generator controller 20 may include adjustable set points that can be modified in order to change the operation of the power management system 10. In those embodiments where the power management system 10 includes a server 30 that is connected to the generator controller over the network N, the server 30 may be used to remotely adjust and/or synchronize the adjustable set points with the generator controller 20.

The generator controller 20 may determine whether to operate the variable speed generator 12 based on the charge level of the energy storage device 16. In some embodiments, the generator controller 20 may operate in a tower power state once the generator controller 20 determines that the variable speed generator 12 does not need to operate based on the charge level of the energy storage device 16.

It should be noted that the generator controller 20 may operate in a lower power state for a predetermined period of time. In addition, the generator controller 20 may again determine whether to operate the variable speed generator 12 based on the charge level of the energy storage device 16 after the predetermined period of time. Embodiments are contemplated where the generator controller 20 provides commands to other components in the power management system 10 to operate in a lower power state before the generator controller 20 operates in the lower power state.

In another example embodiment, the generator controller 20 may not only control the speed of the variable speed generator 12 and monitor a charge level of the energy storage device 16, but the generator controller 20 may also supply power from the energy storage device 16 to other components in the power management system 10 besides the loads L. In some embodiments, the other components in the power management system 10 are connected to the bus 11.

As an example, the power management system 10 may further include a generator battery 40 that starts the variable speed generator 12 where the energy storage device 16 charges the generator battery 40. Embodiments are also contemplated where the energy storage device 16 directly starts the variable speed generator 12. In addition, the energy storage device 16 may power the generator controller 20, especially when alternate sources of powering the generator controller 20 are unavailable.

Figure 2:
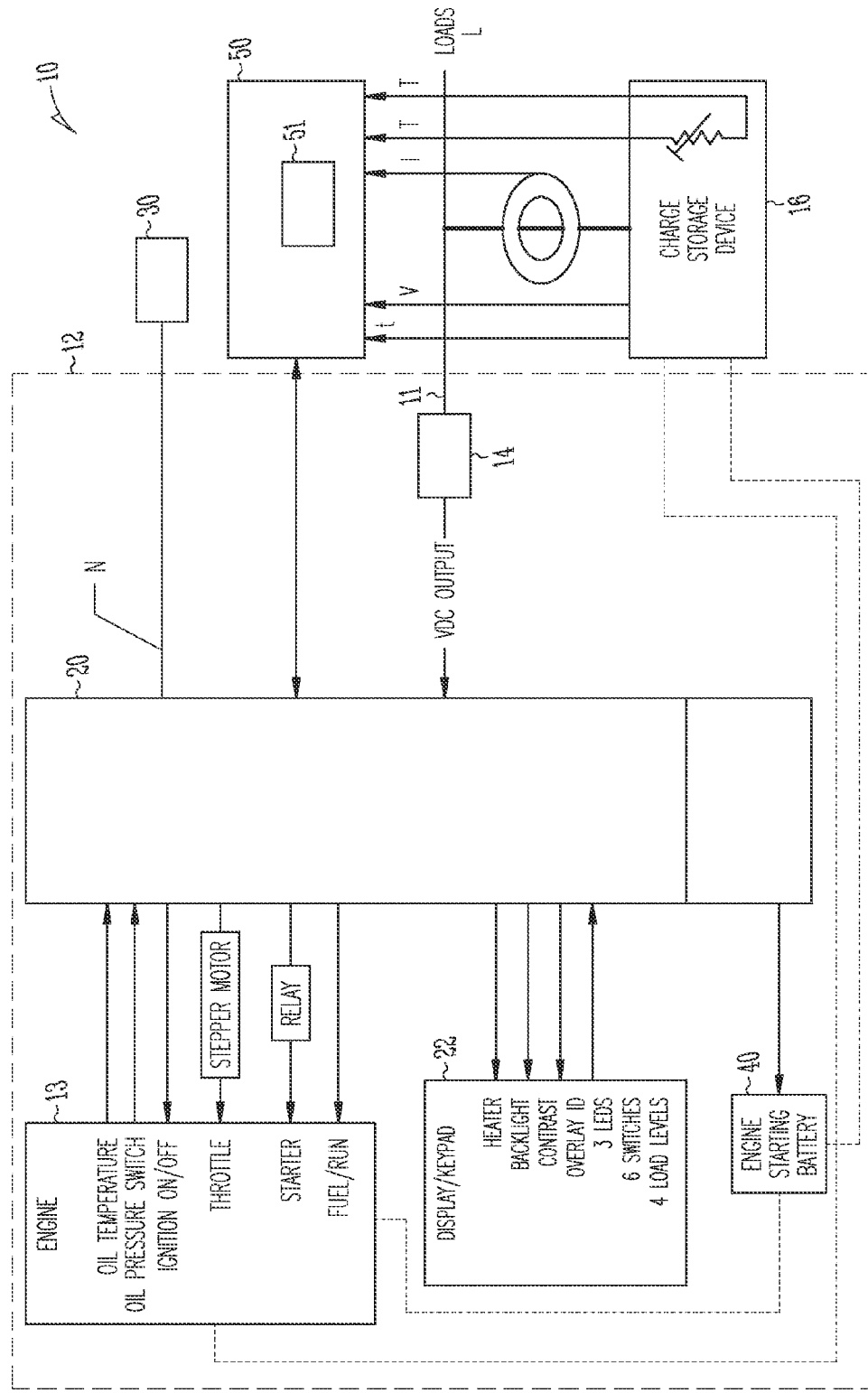
FIG. 2 is a functional block diagram illustrating the example power management system of FIG. 1 where the power management system further includes an energy storage device control module.

FIG. 2 shows another example embodiment where the power management system 10 further includes an energy storage device control module 50. The energy storage device control module 50 exchanges data with the generator controller 20 relating to the charge level of the energy storage device 16. In addition, the generator controller 20 operates the variable speed generator 12 based on the data received from the energy storage device control module 50.

It should be noted that the generator controller 20 may monitor a charge level of the energy storage device 16 based on the data received from the energy storage device control module 50. The energy storage device control module 50 may also receive commands from the generator controller 20 relating operation of the energy storage device 16.

In some embodiments, the energy storage device control module 50 monitors a time t in service of the energy storage device 16. In addition, the energy storage device control module 50 may include a display 51 that (i) displays information relating to a charge level of the energy storage device 16, and/or (ii) displays information relating to a percentage load of the energy storage device 16 (among other operating parameters of the energy storage device 16).

Figure 3:
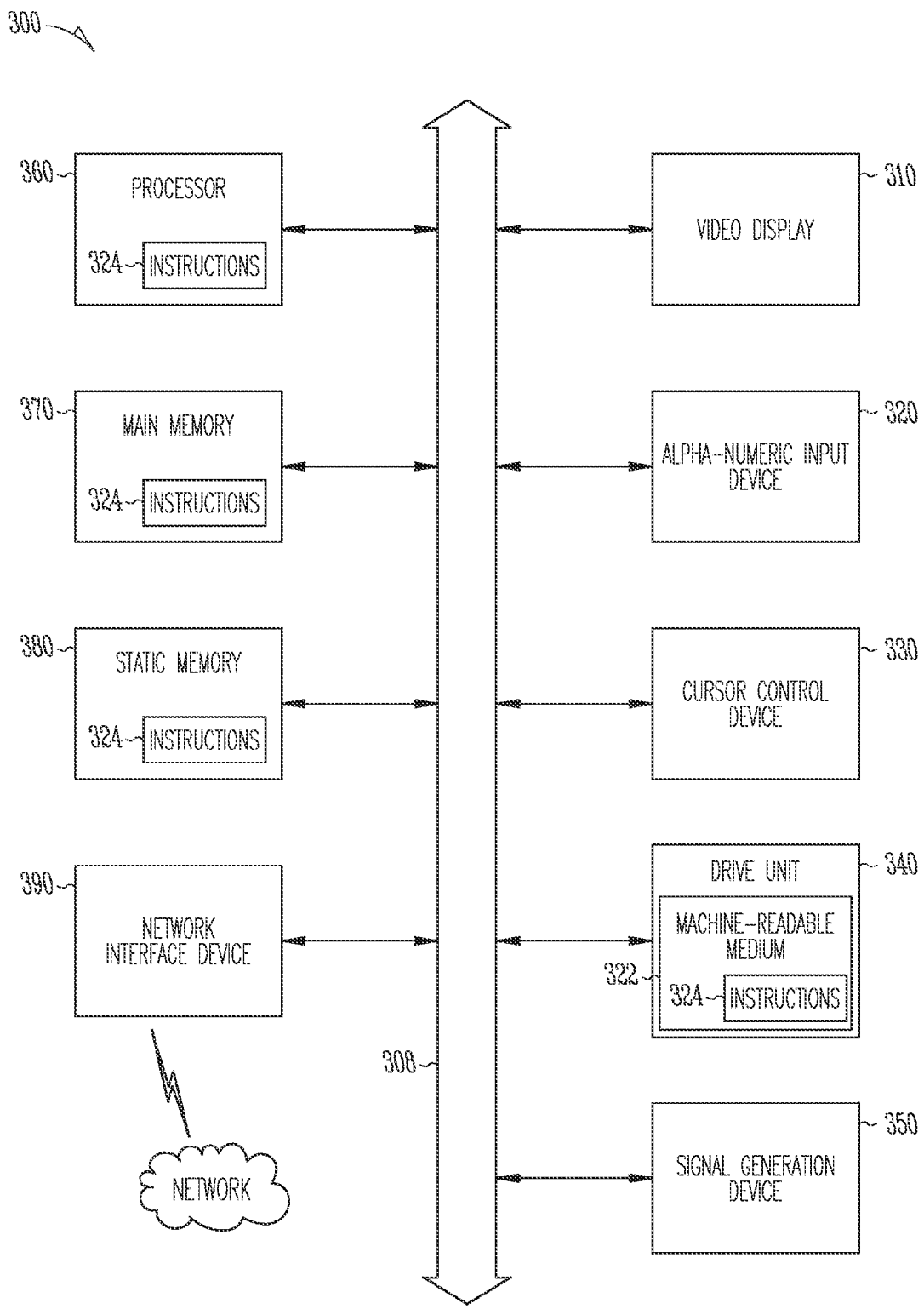
FIG. 3 is a block diagram that illustrates a diagrammatic representation of a machine in the example form of a computer system within which a set of instructions for causing the machine to perform any one or more of the methodologies and/or functions discussed herein may be executed.

FIG. 3 is a block diagram that illustrates a diagrammatic representation of a machine in the example form of a computer system 300 within which a set of instructions for causing a machine to perform any one or more of the methods and/or functions discussed herein may be executed. As examples, the computer system 300 may execute any of the methods and/or functions that are performed by any of the disclosed example generator controllers 20, servers 30 and/or energy storage device control modules 50.

In some embodiments, the computer system 300 may operate in the capacity of a server or a client machine in a server-client network environment, or as a peer machine in a peer-to-peer (or distributed) network environment. The computer system 300 may include a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 360 (e.g., a central processing unit (CPU), a graphics processing unit (GPU) or both), a main memory 370 and a static memory 380, all of which communicate with each other via a bus 308. The computer system 300 may further include a video display unit 310 (e.g., liquid crystal displays (LCD) or cathode ray tube (CRT)). The computer system 300 also may include an alphanumeric input device 320 (e.g., a keyboard), a cursor control device 330 a mouse), a disk drive unit 340, a signal generation device 350 (e.g., a speaker), and a network interface device 390.

The disk drive unit 340 may include a machine-readable medium 322 on which is stored one or more sets of instructions (e.g., software 324) embodying any one or more of the methodologies or functions described herein. The software 324 may also reside, completely or at least partially, within the main memory 370, and/or within the processor 360 during execution thereof by the computer system 300, the main memory 370 and the processor 360 also constituting machine-readable media. It should be noted that the software 324 may further be transmitted or received over a network (e.g., network N in FIGS. 1 and 2) via a network interface device 390.

White the machine-readable medium 322 is shown in an example embodiment to be a single medium, the term "machine-readable medium" should be taken to include a single medium or multiple media (e.g., a centralized or distributed database, and/or associated caches and servers)

that store the one or more sets of instructions. The term "machine-readable medium" shall also be taken to include any medium that is capable of storing, encoding or carrying a set of instructions for execution by the machine and that cause the machine to perform any one or more of example embodiments described herein. The term "machine-readable medium" shall accordingly be taken to include, hut not be limited to, solid-state memories and optical and magnetic media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power management system comprising:
   a variable speed generator that provides a voltage output to a bus, wherein the bus is adapted to be connected to a load and an energy storage device; and
   a generator controller that controls the speed of the variable speed generator, wherein the generator controller monitors a charge level of the energy storage device, wherein the generator controller remotely displays information relating to operation of the power management system, wherein the generator controller provides information relating to operation of the power management system over a network, wherein the generator controller operates in a lower power state when the generator controller determines that the variable speed generator does not need to operate based on the charge level of the energy storage device.

2. The power management system of claim 1, wherein the variable speed generator includes an internal combustion engine that drives an alternator.

3. The power management system of claim 1, wherein the generator controller starts and stops the variable speed generator based on the charge level of the energy storage device.

4. The power management system of claim 1, wherein the generator controller supplies power from the variable speed generator to the energy storage device.

5. The power management system of claim 4, wherein the generator controller supplies power from the variable speed generator to the energy storage device based on the charge level of the energy storage device.

6. The power management system of claim 1, wherein the generator controller displays information relating to a charge level of the energy storage device.

7. The power management system of claim 1, wherein the generator controller displays information relating to the variable speed generator.

8. The power management system of claim 1, wherein the generator controller displays information relating to a percentage load of the variable speed generator.

9. The power management system of claim 1, further comprising a server that is connected to the generator controller over the network, wherein the server stores information relating to the charge level of the energy storage device and the operation of the power management system.

10. A power management system comprising:
    a variable speed generator that provides a voltage output to a bus that is adapted to be connected to a load and an energy storage device; and
    a generator controller that controls the speed of the variable speed generator, wherein the generator controller monitors at least one of (i) a voltage of the energy storage device; (ii) a current supplied by the energy storage device; (iii) a temperature of the energy storage device; or (iv) a time in service of the energy storage device, wherein the generator controller monitors a charge level of the energy storage device based on at least one of the time, voltage, current and temperature, wherein the generator controller determines whether to operate the variable speed generator based on the charge level of the energy storage device, wherein the generator controller operates in a lower power state when the generator controller determines that the variable speed generator does not need to operate based on the charge level of the energy storage device.

11. The power management system of claim 10, further comprising a server that is connected to the generator controller over the network, wherein the server synchronizes the adjustable set points with the generator controller.

12. The power management system of claim 10, wherein the generator controller monitors current supplied by the energy storage device accumulated over time.

13. The power management system of claim 10, wherein the generator controller operates in a lower power state for a predetermined period of time.

14. The power management system of claim 13, wherein the generator controller again determines whether to operate the variable speed generator based on the charge level of the energy storage device after the predetermined period of time.

15. The power management system of claim 10, wherein the generator controller provides commands to other components in the power management system to operate in a lower power state before the generator controller operates in the lower power state.

16. A power management system comprising:
    a variable speed generator that provides a voltage output to a bus, wherein the bus is adapted to be connected to a load and an energy storage device;
    a generator controller that controls the speed of the variable speed generator, wherein the generator controller monitors a charge level of the energy storage device, wherein the generator controller supplies power from the energy storage device to other components in the power management system besides the load, wherein the generator controller operates in a lower power state when the generator controller determines that the variable speed generator does not need to operate based on the charge level of the energy storage device.

17. The power management system of claim 16, wherein the energy storage device starts the variable speed generator.

18. The power management system of claim 16, wherein the energy storage device powers the generator controller.

19. The power management system of claim 16, wherein the other components in the power management system are connected to the bus.

20. A power management system comprising:
    a variable speed generator that provides a voltage output to a bus that is adapted to be connected to a load and an energy storage device;
    a generator controller that controls the speed of the variable speed generator, wherein the generator controller obtains data relating to the charge level of the energy storage device, wherein the generator controller operates the variable speed generator based on the data, wherein the generator controller operates in a lower power state when the generator controller determines that the variable speed generator does not need to operate based on the charge level of the energy storage device.

21. The power management system of claim 20, wherein the generator controller displays information relating to a charge level of the energy storage device.

22. The power management system of claim 20, wherein the generator controller displays information relating to a percentage load of the energy storage device.

23. The power management system of claim 20, further comprising a server that synchronizes operating parameters of the power management system with the generator controller over a network.

* * * * *